Jan. 8, 1952 F. KRAHULEC 2,582,043

STYLUS FOR GRAPHIC RECORDING

Original Filed March 27, 1947

INVENTOR.
Fred Krahulec
BY
Mason, Kolehmainen, Rathburn & Wyss
Att'ys

Patented Jan. 8, 1952

2,582,043

UNITED STATES PATENT OFFICE 2,582,043

STYLUS FOR GRAPHIC RECORDING

Fred Krahulec, Skokie, Ill., assignor to A. C. Nielsen Company, Chicago, Ill., a corporation of Illinois Original application March 27, 1947, Serial No. 737,529. Divided and this application June 10, 1948, Serial No. 32,240

3 Claims. (Cl. 346—140)

The present invention relates to a stylus and associated mechanisms which are particularly adapted for use in the art of graphic recording where it is often desired to make continuous records or traces of variable characteristics. Specifically this application is a division of co-pending application Serial No. 737,529, filed March 27, 1947, now Patent 2,484,298.

The art of graphic recording has produced various recording media and associated styli. Extensively used in this connection is the capillary pen which uses liquid ink, the ink being contained in a fixed reservoir or in the pen body proper. In either case the reservoir is open to the air and is subject to spilling troubles and in addition such a pen generally requires constant attention to maintain it in a state of satisfactory operation. It has even been suggested to use a wearable pencil as the stylus for such graphic recording, but this has the disadvantage that a sharp point cannot be maintained even though an automatic feed is employed to position the point for optimum writing pressure. Various types of heated styli operating on specially treated paper have been employed to produce fine traces, but usually such a close correlation between the temperature of the stylus and the recording speed is required that such schemes are impractical for general applications and furthermore in the event that the recording mechanism should happen to fail there is always the danger of igniting the recording paper. In some applications a waxed tape recording element has been employed wherein the trace is produced by a stylus which scrapes off minute flakes of wax. Due to the fact that the flakes of wax are likely to be deposited on various parts of the graphic recording instrument with the concomitant operating difficulties this type of recording media and associated styli is not very satisfactory. It would be desirable to provide a stylus which would employ a writing fluid, such as ink, whereby different colored traces could be made when desired but which would eliminate the disadvantages of the styli used heretofore employing liquid ink from the standpoint of spilling difficulties as well as with reference to the attention required.

Accordingly it is an object of the present invention to provide a new and improved recording stylus.

It is another object of the present invention to provide a new and improved stylus for use in the art of graphic recording which employs a writing fluid and which overcomes the disadvantages heretofore inherent in that type of recording stylus.

Still another object of the present invention is to provide a new and improved recording stylus employing a ball point pen and a paste ink.

It is a feature of the present invention to provide a stylus for producing a trace on a movable record tape which stylus employs a ball point pen with suitable means to force the paste ink into contact with the ball point which means also provides an indication of the amount of ink in the pen.

It is a further object of the present invention to provide a ball point recording stylus with magnetic or electromagnetic means for controlling the position of the stylus relative to the recording tape which magnetic or electromagnetic means acts on the ball of the ball point stylus.

Further objects and advantages of the present invention will become apparent as the following description proceeds, and the features of novelty which characterize the invention will be pointed out with particularity in the claims annexed to and forming a part of this specification.

For a better understanding of the present invention reference may be had to the accompanying drawing in which.

Figures 1, 2, 3, 4, 5:
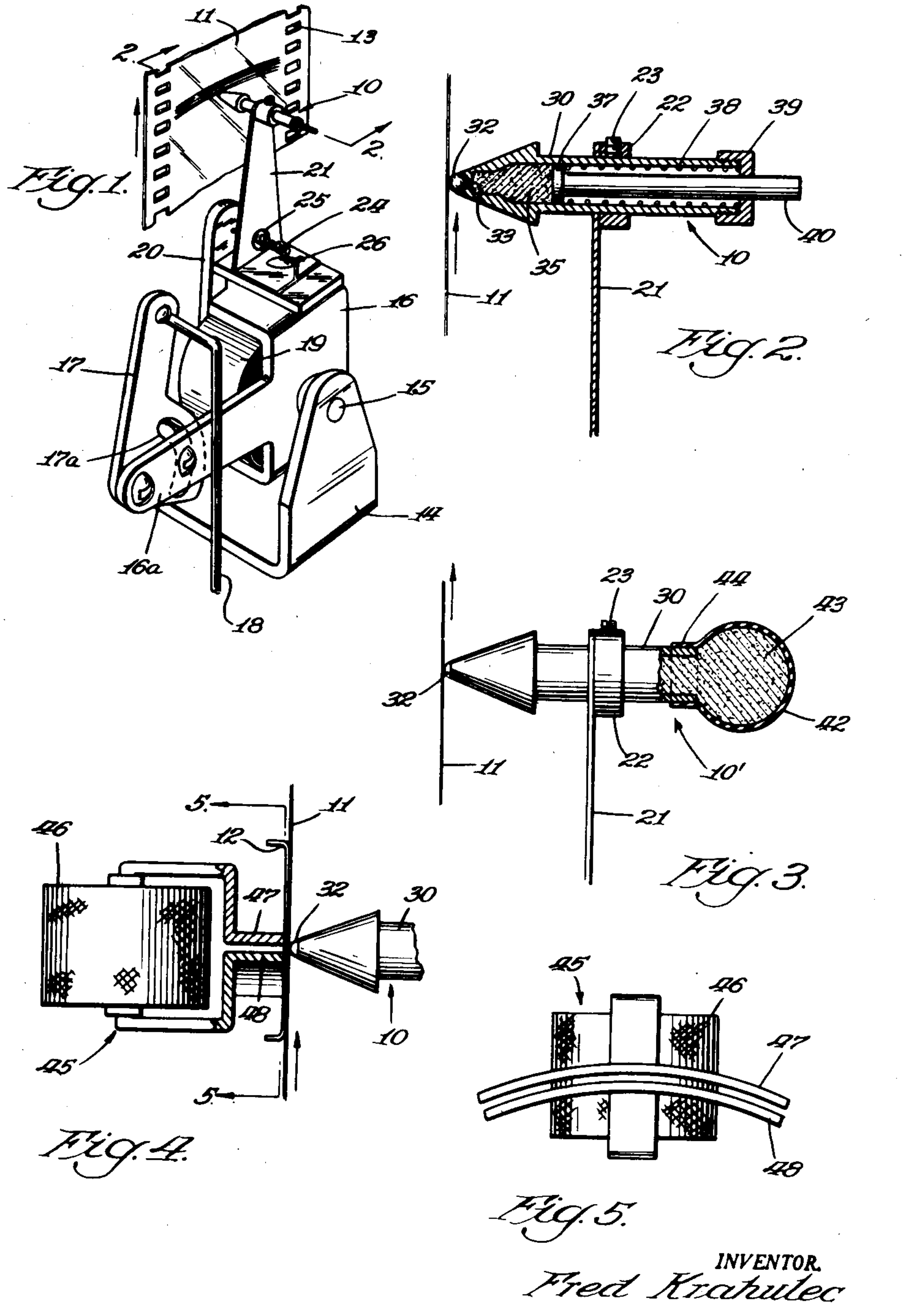
Fig. 1 is a perspective view of a recording stylus embodying the present invention shown in connection with a particular application thereof.
Fig. 2 is an enlarged sectional view taken on line 2—2 of Fig. 1.
Fig. 3 is a partly sectional view similar to Fig. 2 illustrating a modification of the invention.
Fig. 4 is an enlarged view of a portion of the stylus of Fig. 2 or 3 illustrating still another modification of the present invention.
Fig. 5 is a view taken on line 5—5 of Fig. 4.

It will be understood that the recording stylus of the present invention has numerous applications. For the purpose of illustrating the invention, however, it has been shown in Fig. 1 as applied to an operating mechanism associated with the recording apparatus of a device by means of which the listening habits of wave signal receiver users can be determined. A recording mechanism embodying the stylus supporting means illustrated in Fig. 1 of the drawing is disclosed in a co-pending application of Henry A. Rahmel, Serial No. 762,962, filed July 23, 1947, and assigned to the same assignee as the present application.

Referring now to Fig. 1 of the drawing there is illustrated a recording stylus 10 with which the present invention is specifically concerned. As illustrated, this recording stylus is disposed in a horizontal position and adapted to produce a record on a movable recording element such as the tape 11 illustrated as being adapted to be moved along a vertical plane. It will be understood that a suitable platen such as is indicated at 12 in Fig. 4 of the drawing will be disposed along the back surface of the recording tape 11 for suitably supporting the recording tape 11 when the stylus 10 is in engagement therewith for producing a record trace thereon. In an application such as a device for recording the listening habits of wave signal receiver users, the recording tape 11 is adapted to be driven at a constant speed by suitable means including a sprocket for engaging edge perforations such as 13 provided in the recording tape 11.

In the arrangement disclosed in Fig. 1 of the drawing, the stylus 10 is adapted to move transversely of the movable record tape 11 between the two rows of edge perforations 13. The mechanism for causing the stylus to move in this manner is illustrated as comprising a stationary support 14 to which is pivotally mounted as indicated at 15 a suitable yoke 16. The yoke 16 is provided with an integral extension 16*a* to which is connected an arm 17 which in turn is connected to a suitable link 18. The link 18 is preferably connected to a crank fastened to the rotatable shaft of a suitable driving mechanism such as a sweep motor which causes the yoke 16 to pivot back and forth about the axis 15 whereupon the stylus 10 moves back and forth transversely of the movable tape 11 so that if in recording engagement therewith it would produce an arcuate trace with its each movement across the tape 11. Preferably the arm 17 is provided with adjustable means including an elongated slot indicated at 17*a* for controlling the throw or sweep of the arm 16*a* and consequently of the stylus 10 whereby the trace produced by the stylus 10 may be confined between the edge perforations 13 of the tape 11.

In many applications it is desirable for the recording stylus such as 10 to make no trace or record on the recording tape such as 11 except under predetermined conditions. In such an application it is desirable to provide means for selectively rendering the recording stylus such as 10 effective or ineffective. Such an arrangement is shown in Fig. 1 of the drawing wherein the yoke 16 also provides the magnetic circuit of an electromagnet having a winding coil 19 and a movable armature 20 pivotally mounted in a suitable manner from the yoke 16. The upper end of the armature 20 is adapted to engage a flexible support 21 which includes at its upper end a suitable sleeve 22 for removably supporting the stylus 10 as by a set screw 23. A suitable spring 24 extending through an opening 25 in the flexible support 21 is provided to bias the end of the armature 20 remote from the stylus 10 away from the coil 19, thereby maintaining the stylus 10 out of recording engagement with the record tape 11. Upon energization of the electromagnet comprising the winding 19 the armature 20 is pivoted in a counter-clockwise direction as viewed in Fig. 1 of the drawing whereby the flexible support 21 of the stylus 10 biases the stylus into recording engagement with the recording element 11. It should be understood that the mechanism for supporting the stylus 10 to produce a predetermined type of trace on the record tape 11 forms no part of the present invention but is merely illustrated for the purpose of more clearly understanding the problems encountered in connection with recording styli used in the art of graph recording.

In accordance with the present invention, the recording stylus 10 as shown in sectional view in Fig. 2 of the drawing, comprises a suitable cylindrical container or barrel 30 having one end adjacent the recording tape 11 of conical configuration so as to support at that end a suitable ball, preferably formed of steel or other suitable magnetic material, generally indicated at 32. This ball 32 is mounted so as to be retained in the end of the barrel 30 in a freely rotatable manner, and a relatively small metering hole or restricted orifice 33 connects the hollow space defined within the barrel or cylinder 30 with the surface of the ball 32. A substantial portion of the space within the barrel or cylinder 30 is adapted to be filled with a suitable non-flowable writing fluid preferably in paste form indicated at 35 in Fig. 2 of the drawing. It should be understood that refills for the stylus 10 may be in the form of a cartridge or the like.

For the purpose of insuring continual contact of the ball 32 with the writing fluid 35 contained within the barrel 30 there is provided a suitable piston or plunger 37 which is adapted for reciprocal movement within the cylinder 30 in sealing engagement with the walls thereof. A suitable spring 38 is provided to bias the plunger 37 into engagement with the paste ink 35 thereby continually compressing this material to insure engagement with the ball 32 without in any way depending upon capillary action as has generally been the case heretofore. The end of the container or barrel 30 remote from the ball 32 is preferably closed by a suitable cover 39 through which an indicating rod 40 connected to the plunger 37 is adapted to extend. The cover 39 is provided with suitable sealing means to insure that no writing fluid can escape from the barrel 40. The rod 40 gives an indication whereby the operator in charge of the recording apparatus can readily tell at a glance how much writing fluid is still present in the recording stylus 10 and can roughly estimate the length of time that satisfactory operation can still be obtained therefrom without refilling.

In view of the fact that the writing fluid is in paste form, no danger of spilling of the ink is present which was a common difficulty in ink recording styli employed heretofore. A quick-drying ink may be employed so that successful recording can be made even under high speed conditions. The operator can tell at a glance at the recording stylus 10 as to how long the remaining writing time thereof will be. Furthermore, the writing effect of stylus 10 is not affected by changes in temperature since it has been found that even at temperatures as low as forty degrees Fahrenheit below zero the writing qualities are not substantially affected. By employing a renewable writing fluid cartridge the replenishing problem is very simple and can readily be conducted under very adverse field conditions.

Instead of employing a spring biased plunger as in Fig. 2 of the drawing, there is illustrated in Fig. 3 of the drawing a modification in which the end of the barrel 30 remote from the recording tape 11 is closed by a suitable flexible sack 42 which may be formed of rubber or the like. This sack acts as a holder for a substantial portion of the ink supply which is indicated at 43. Atmospheric pressure acting on the sack 42 will collapse the same so as to force the writing fluid toward the metering hole 33 adjacent the ball 32. An indication of the remaining writing life of the stylus designated as 10′ in Fig. 3 of the drawing can be determined by the collapsed condition of the sack 42. In the event that the stylus 10' should fail to write, the operator could start the pen by squeezing on the sack 42 to displace any air space which has developed adjacent the metering hole 33. It will be understood that the arrangement disclosed in Fig. 2 of the drawing also provides this advantage since the operator may merely press on indicating rod 40 to produce the same result. Soiling of the hands by the writing fluid is of course prevented by the provision of a suitable seal 44 between the sack 42 and the barrel 30.

Although in the arrangement described in connection with Fig. 1 of the drawing the recording stylus 10 is indicated as being out of engagement with the record tape 11 except when it is desired to make a trace or indication thereon, there are applications where it is desired to employ a recording stylus which lightly engages the record tape such as 11 at all times. Such an arrangement is disclosed in Figs. 4 and 5 of the drawing. Preferably the ball 32 of the stylus 10, the parts of which are indicated by the same reference numerals as in the preceding figures, engages the tape 11 so lightly as not to produce any substantial record indication thereon. When it is desired to produce an indication on the tape 11, there is provided an electromagnet generally indicated at 45 comprising the winding 46 and the pole pieces 47 and 48 which are arranged in an arcuate manner as is best shown in Fig. 5 of the drawing to correspond with the arcuate path taken by the stylus 10 by virtue of the pivotal movement of the yoke 16. When the electromagnet 45 is rendered effective by energizing the winding 46, the pole pieces 47 and 48 tend to attract the steel or magnetic ball 32 so as to pull the ball into writing engagement with the tape 11. It will be understood that the platen 12 will be constructed of suitable non-magnetic material such as brass, a suitable plastic or the like.

It will also be apparent that with the arrangement disclosed in Figs. 4 and 5 of the drawing the electromagnet of Fig. 1 comprising the winding 19 and the armature 20 may be dispensed with since a similar function is produced by the electromagnet 45. Even with the arrangement disclosed in Fig. 1, however, it may be desirable to employ a permanent magnet provided with pole pieces similar to 47 and 48 to produce increased writing pressure of the stylus as it is moved into engagement with the tape 11 and consequently as the ball 32 is moved into the coercive range of the permanent magnet, not shown.

In view of the detailed description included above, the operation of the improved recording stylus and associated mechanism of the present invention will be apparent, and no further discussion thereof is included herein. It will be undertsood that there has been provided a recording stylus employing a writing fluid which cannot be spilled and which does not have the disadvantages of the capillary pen employed heretofore. Furthermore, there is no piling up of flakes of wax as in recorders employing a tape of the type provided with a wax coating within which the trace is cut, and the disadvantages inherent in using heated styli are completely eliminated. The stylus of the present invention is of sturdy and inexpensive construction and is adapted to give long and fool-proof operation with a minimum of attention.

It will be apparent to those skilled in the art that the present invention is not limited to the particular constructions and arrangements shown and described, but that changes and modifications may be made without departing from the spirit and scope of the invention. It is aimed in the appended claims to cover all such changes and modifications.

What is claimed as new and desired to be secured by Letters Patent of the United States is:

1. In a graphic recording apparatus of the type employing a movable record tape, a stylus for producing a trace on said tape comprising a barrel adapted to contain a non-flowable writing fluid, a ball of material capable of being attracted by a magnet rotatably mounted at one end of said barrel and adapted to rotate when said stylus is in engagement with said tape and relative movement between said stylus and tape occurs, and an electromagnet having pole pieces disposed on the opposite side of said tape from said ball and adapted when energized to pull said stylus into trace producing engagement with said tape through magnetic attraction of said ball.

2. In a graphic recording apparatus of the type employing a movable recording element, a non-magnetic backing member for said recording element, a stylus for producing an indication on said element while said element is in engagement with said backing member comprising a barrel adapted to contain a non-flowable writing fluid, a steel ball rotatably mounted at one end of said barrel and adapted to rotate when said stylus is in engagement with said element and relative movement between said stylus and element occurs, means for supporting said stylus for arcuate movement, magnetic means including arcuate pole pieces disposed on the opposite side of said element and backing member from said ball for rendering said stylus effective to produce an indication on said recording element through magnetic attraction of said ball by said magnetic means throughout the arcuate path of movement of said stylus.

3. In a graphic recording apparatus of the type employing a movable recording element, a stylus for producing an indication on said element comprising a horizontally positioned barrel adapted to contain a non-flowable writing fluid, a steel ball rotatably mounted at one end of said barrel and adapted to rotate when said stylus is in engagement with said element and relative movement between said stylus and element occurs, and magnetic means disposed on the opposite side of said element from said ball for magnetically attracting said ball and consequently said stylus to move said ball into record producing engagement with said recording element.

FRED KRAHULEC.

REFERENCES CITED

The following references are of record in the file of this patent:

UNITED STATES PATENTS

| Number | Name | Date |
|---|---|---|
| 518,534 | Olan | Apr. 17, 1894 |
| 807,518 | Vawter Jr. | Dec. 19, 1905 |
| 2,438,786 | Moore | Mar. 30, 1948 |
| 2,444,003 | Chesler | June 22, 1948 |
| 2,484,298 | Krahulec | Oct. 11, 1949 |
| 2,485,224 | Wahl | Oct. 18, 1949 |
| 2,521,038 | Canaday | Sept. 5, 1950 |

FOREIGN PATENTS

| Number | Country | Date |
|---|---|---|
| 422,691 | Germany | Dec. 9, 1925 |